(12) United States Patent
Dodke et al.

(10) Patent No.: US 10,191,908 B1
(45) Date of Patent: Jan. 29, 2019

(54) SYSTEMS AND METHODS FOR MANAGING DATA LOSS PREVENTION POLICIES FOR APPLICATIONS

(75) Inventors: Dhananjay Namdeo Dodke, Pune Maharashtra (IN); Sarin Sumit Manmohan, Pune Maharashtra (IN)

(73) Assignee: Symantec Corporation, Mountain View, CA (US)

(*) Notice: Subject to any disclaimer, the term of this patent is extended or adjusted under 35 U.S.C. 154(b) by 557 days.

(21) Appl. No.: 13/291,426

(22) Filed: Nov. 8, 2011

(51) Int. Cl.
*G06F 17/30* (2006.01)

(52) U.S. Cl.
CPC .............. *G06F 17/30115* (2013.01)

(58) Field of Classification Search
CPC .................. G06F 17/30; G06F 17/30115
USPC .............................................. 707/609
See application file for complete search history.

(56) References Cited

U.S. PATENT DOCUMENTS

| | | | |
|---|---|---|---|
| 2008/0059474 A1* | 3/2008 | Lim | G06F 17/3089 |
| 2008/0060080 A1* | 3/2008 | Lim | G06F 21/62 726/26 |
| 2008/0109871 A1* | 5/2008 | Jacobs | H04L 63/20 726/1 |
| 2010/0235918 A1* | 9/2010 | Mizrahi et al. | 726/25 |
| 2012/0131635 A1* | 5/2012 | Huapaya | 726/1 |

* cited by examiner

*Primary Examiner* — Irete F Ehichioya
*Assistant Examiner* — Johnese Johnson
(74) *Attorney, Agent, or Firm* — Fisher Broyles, LLP (57) ABSTRACT

A method for managing data loss prevention policies for applications may include 1) maintaining, in at least one database, a categorization of at least one application as either a business application or a personal application, 2) assigning, in the database, a data loss prevention policy to the application based on the categorization of the application in the database as either a business application or a personal application, 3) detecting that the application is attempting to access sensitive data, and 4) applying, in response to the detected attempt by the application to access sensitive data, the data loss prevention policy assigned to the application to the detected attempt by the application to access sensitive data. Various other methods, systems, and computer-readable media are also disclosed.

20 Claims, 8 Drawing Sheets

| | Application Categorization 412 | Daytime Factor 414 | Authorized Group Factor 416 | Authorized Recipient Factor 418 |
|---|---|---|---|---|
| Webmail 402 | Personal | Override Heuristic 420 | Override Heuristic 422 | Override Heuristic 424 |
| Word Processor 404 | Business | Override Heuristic 426 | Override Heuristic 428 | Override Heuristic 430 |
| Desktop Email 406 | Business | Override Heuristic 432 | Override Heuristic 434 | Override Heuristic 436 |
| Web Browser 408 | Personal | Override Heuristic 438 | Override Heuristic 440 | Override Heuristic 442 |
| Instant Messaging 410 | Personal | Override Heuristic 444 | Override Heuristic 446 | Override Heuristic 448 |

SYSTEMS AND METHODS FOR MANAGING DATA LOSS PREVENTION POLICIES FOR APPLICATIONS

BACKGROUND

Individuals and groups, including businesses, often create or possess information that they do not desire to share with others. The owners of such sensitive data may find that maintaining this data in a confidential or internal state is difficult for various reasons, including due to various technological advances such as high-speed Internet access, smart mobile devices, portable storage devices, and third-party storage services.

Data may leak from its original owner in a variety of ways. For example, an employee within a business may leak data inadvertently, either because the employee is unaware of a policy against sharing data or because the employee is unaware that his/her actions may cause a violation of such a policy. An employee or other person may also leak data intentionally, including for retribution or for personal gain.

Some owners of data have responded to the problem of data leaks by implementing data loss prevention (DLP) systems. Conventional DLP systems are typically data-centric; that is, they focus on determining whether a particular item of data is sensitive and, if the data is sensitive, enforcing a policy to ensure that the data is not leaked. Data-centric DLP systems typically execute in either a blocking mode, which prevents interactions with sensitive data, or a monitoring mode, which merely monitors interactions with sensitive data.

Unfortunately, the above-described data-centric approach used by many conventional DLP systems may suffer from a number of limitations and deficiencies. For example, if a business chooses to operate its DLP system in a blocking mode, the workflows of employees within this business may be constantly interrupted with DLP errors or notifications, even if these employees are attempting to access sensitive data in an appropriate manner. However, if a business chooses to operate its DLP system in a monitoring mode, this may result in data loss or policy non-compliance since inappropriate interactions with sensitive data are merely monitored, as opposed to blocked. In addition, while conventional DLP systems may enable businesses to whitelist entire applications to indicate which applications are allowed access to sensitive data, whitelisted applications are typically not monitored, which may result in a loss of visibility of the flow of sensitive data. As such, the instant disclosure identifies a need for improved systems and methods for managing data loss prevention policies.

SUMMARY

As will be described in greater detail below, the instant disclosure generally relates to systems and methods for managing data loss prevention policies for applications. In one example, a computer-implemented method for managing data loss prevention policies for applications may include 1) maintaining, in a database, a categorization of an application as either a business application or a personal application, 2) assigning, in the database, a data loss prevention policy to the application based on the categorization of the application in the database as either a business application or a personal application, 3) detecting that the application is attempting to access sensitive data, and 4) applying, in response to the detected attempt by the application to access sensitive data, the data loss prevention policy assigned to the application to the detected attempt by the application to access sensitive data.

Assigning the data loss prevention policy may include basing a degree of restrictiveness of the data loss prevention policy on the categorization of the application in the database as either a business application or a personal application. A more restrictive data loss prevention policy may be based at least in part on the application being categorized as a personal application, and a less restrictive data loss prevention policy may be based at least in part on the application being categorized as a business application. The more restrictive data loss prevention policy may include a blocking response rule that blocks a user action. The less restrictive data loss prevention policy may include a monitoring response rule that monitors, but does not block, the user action.

In addition, the method may include maintaining, in the database, a list of one or more users assigned to a business group. The method may also include maintaining, in the database, a list of one or more applications assigned to the business group.

In some examples, the method may also include maintaining the categorization of the application in the database at least in part by basing the categorization on whether a current user of the application is assigned to the same business group as the application in the database. Maintaining the list of one or more applications may include maintaining, in the database, a list of one or more applications assigned a department. Maintaining the list of one or more applications may also include maintaining, in the database, a list of one or more business groups assigned to the department. The application may also be categorized as a personal application based on the application not being assigned to any business group.

In some examples, maintaining the categorization of the application in the database may include enabling an administrator to manually assign the categorization. In these examples, enabling the administrator to manually assign the categorization may include providing a graphical user interface that enables the administrator to assign or reassign the categorization.

In one example, maintaining the categorization of the application in the database may include inputting, into a heuristic, factors that are relevant to determining whether the application is a business application or a personal application. Maintaining the categorization of the application in the database may also include executing the heuristic on the factors. In some embodiments, inputting the factors may include inputting a factor from each of multiple users of the application.

In one embodiment, a system for implementing the above-described method may include 1) a maintenance module programmed to maintain, in a database, a categorization of an application as either a business application or a personal application, 2) an assignment module programmed to assign, in the database, a data loss prevention policy to the application based on the categorization of the application in the database as either a business application or a personal application, 3) a detection module programmed to detect that the application is attempting to access sensitive data, 4) an application module programmed to apply, in response to the detected attempt by the application to access sensitive data, the data loss prevention policy assigned to the application to the detected attempt by the application to access sensitive data, and 5) at least one processor configured to execute the maintenance module, assignment module, detection module, and application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) maintain, in a database, a categorization of an application as either a business application or a personal application, 2) assign, in the database, a data loss prevention policy to the application based on the categorization of the application in the database as either a business application or a personal application, 3) detect that the application is attempting to access sensitive data, and 4) apply, in response to the detected attempt by the application to access sensitive data, the data loss prevention policy assigned to the application to the detected attempt by the application to access sensitive data.

As will be explained in greater detail below, the systems and methods disclosed herein may enable data loss prevention systems to execute in an application-centric fashion, in alternative or addition to a data-centric fashion. Because these systems and methods may be application-centric, they may distinguish between applications that should be allowed to interact with sensitive data and those that should not. In addition, even when applications are allowed interact with sensitive data, these applications are not merely whitelisted, but their interactions may be monitored so that visibility of the flow of sensitive data is maintained.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
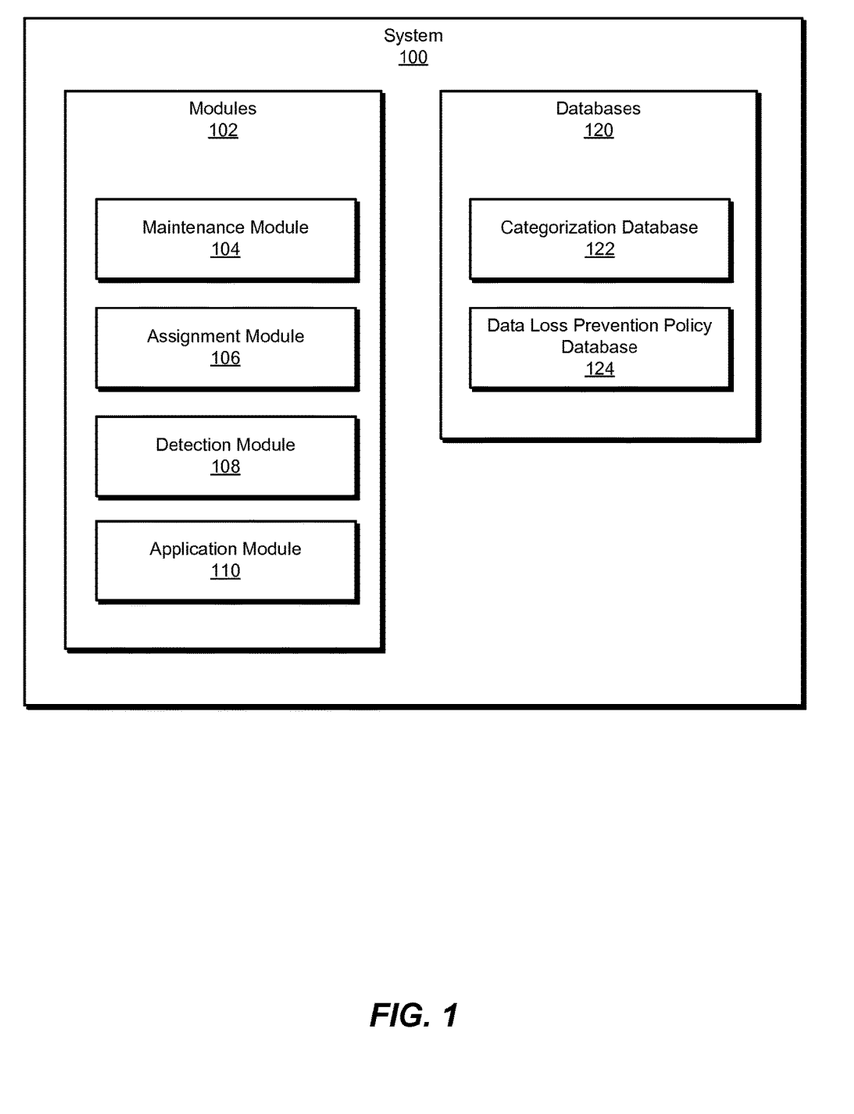
FIG. 1 is a block diagram of an exemplary system for managing data loss prevention policies for applications.
Figure 2:
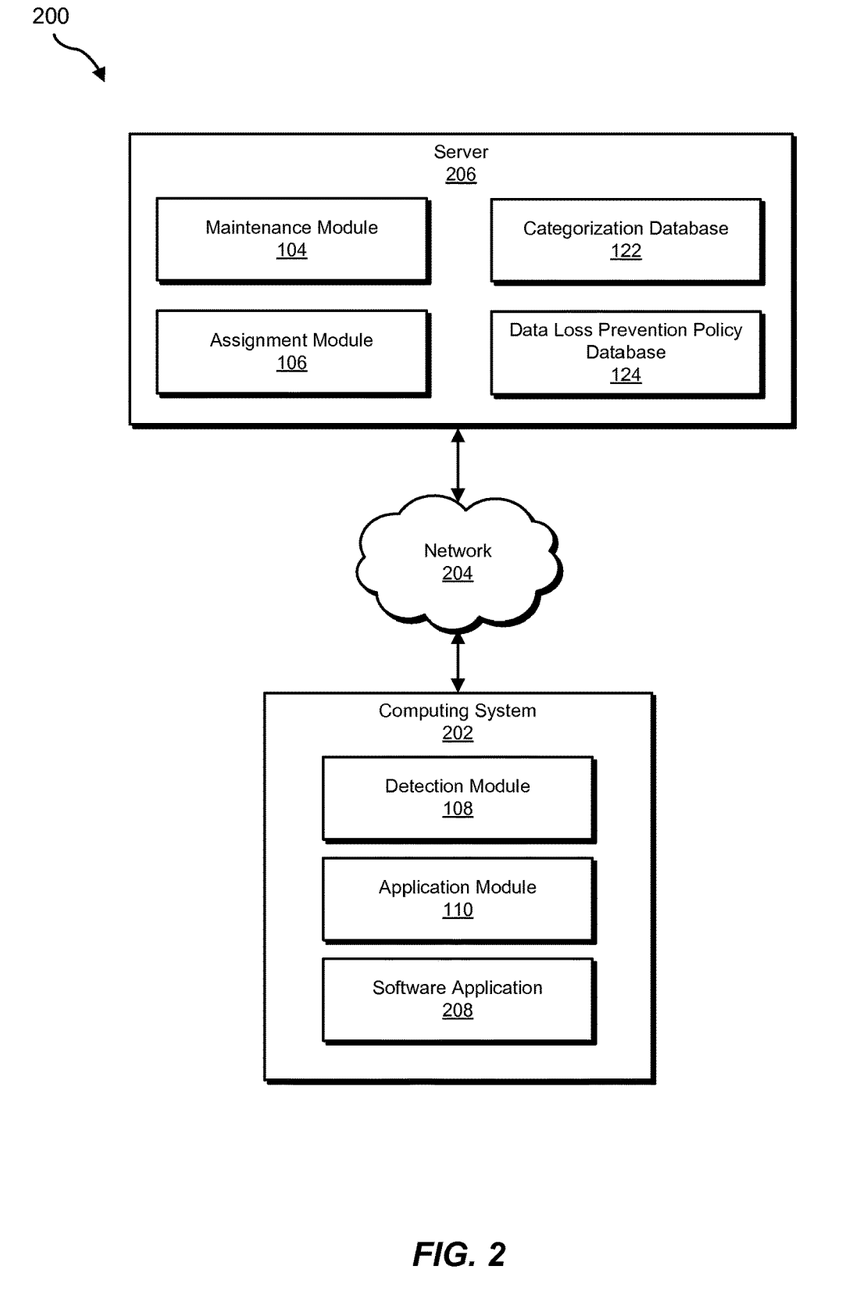
FIG. 2 is a block diagram of an exemplary system for managing data loss prevention policies for applications.

The following will provide, with reference to FIGS. 1-2, detailed descriptions of exemplary systems for managing data loss prevention policies for applications. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for managing data loss prevention policies for applications. As illustrated in this figure, exemplary system 100 may include one or more modules 102 for performing one or more tasks. For example, and as will be explained in greater detail below, exemplary system 100 may include a maintenance module 104 programmed to maintain, in a database, a categorization of an application as either a business application or a personal application. Exemplary system 100 may also include an assignment module 106 programmed to assign, in the database, a data loss prevention policy to the application based on the categorization of the application in the database as either a business application or a personal application.

In addition, and as will be described in greater detail below, exemplary system 100 may include a detection module 108 programmed to detect that the application is attempting to access sensitive data. Exemplary system 100 may also include an application module 110 programmed to apply, in response to the detected attempt by the application to access sensitive data, the data loss prevention policy assigned to the application to the detected attempt by the application to access sensitive data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as databases 120. In one example, databases 120 may include a categorization database 122 configured to store information indicating one or more categories to which an application is assigned. Databases 120 may also include a data loss prevention policy database 124 configured to store various data loss prevention policies that may be assigned or applied to applications.

Databases 120 may represent portions of a single database or computing device or a plurality of databases or computing devices. For example, databases 120 may represent a portion of server 206 in FIG. 2, computing system 710 in FIG. 7, and/or portions of exemplary network architecture 800 in FIG. 8. Alternatively, databases 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 202 in communication with a server 206 via a network 204.

In one embodiment, one or more of modules 102 from FIG. 1 may, when executed by at least one processor of computing system 202 and/or server 206, enable computing system 202 and/or server 206 to manage data loss policies for applications. For example, and as will be described in greater detail below, one or more of modules 102 may cause computing system 202 and/or server 206 to 1) maintain, in at least one database (e.g., categorization database 122), a categorization of at least one application (e.g., software application 208) as either a business application or a personal application, 2) assign, in the database, a data loss prevention policy to the application based on the categorization of the application in the database as either a business application or a personal application, 3) detect that the application is attempting to access sensitive data, and 4) apply, in response to the detected attempt by the application to access sensitive data, the data loss prevention policy assigned to the application to the detected attempt by the application to access sensitive data.

In the example of FIG. 2, computing system 202 may include detection module 108 and application module 110, as well as software application 208. As described in detail below, upon detection module 108 detecting an attempt by an application, such as software application 208, to access sensitive data, application module 110 may apply a data loss prevention policy to the attempt based on a categorization of the application maintained by maintenance module 104 in categorization database 122 by server 206.

Computing system 202 generally represents any type or form of computing system capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 710 in FIG. 7, or any other suitable computing system.

Server 206 generally represents any type or form of computing device that is capable of providing computing system 202 with access to databases 120. In addition to, or alternative to, computing system 202, server 206 may also contain one or more of modules 104, 106, 108, and/or 110. Examples of server 206 include, without limitation, application servers and database servers configured to provide various database services and/or run certain software applications.

In the example of FIG. 2, server 206 may include maintenance module 104 and assignment module 106, as well as databases 122 and 124. As will be described in greater detail below, upon detection module 108 detecting an attempt by an application, such as software application 208, to access sensitive data, server 206 may provide a data loss prevention policy, or information about the policy, to application module 110 based on the categorization of the application in categorization database 122. Alternatively, one or more of modules 104, 106, 108, and/or 110, as well as software application 208, may be stored or executed on a single one of computing system 202 and server 206, or a third party device. Each of databases 122 and 124 may also be stored in computing system 202, server 206, and/or a third party system.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing system 202 and server 206.

Figure 3:
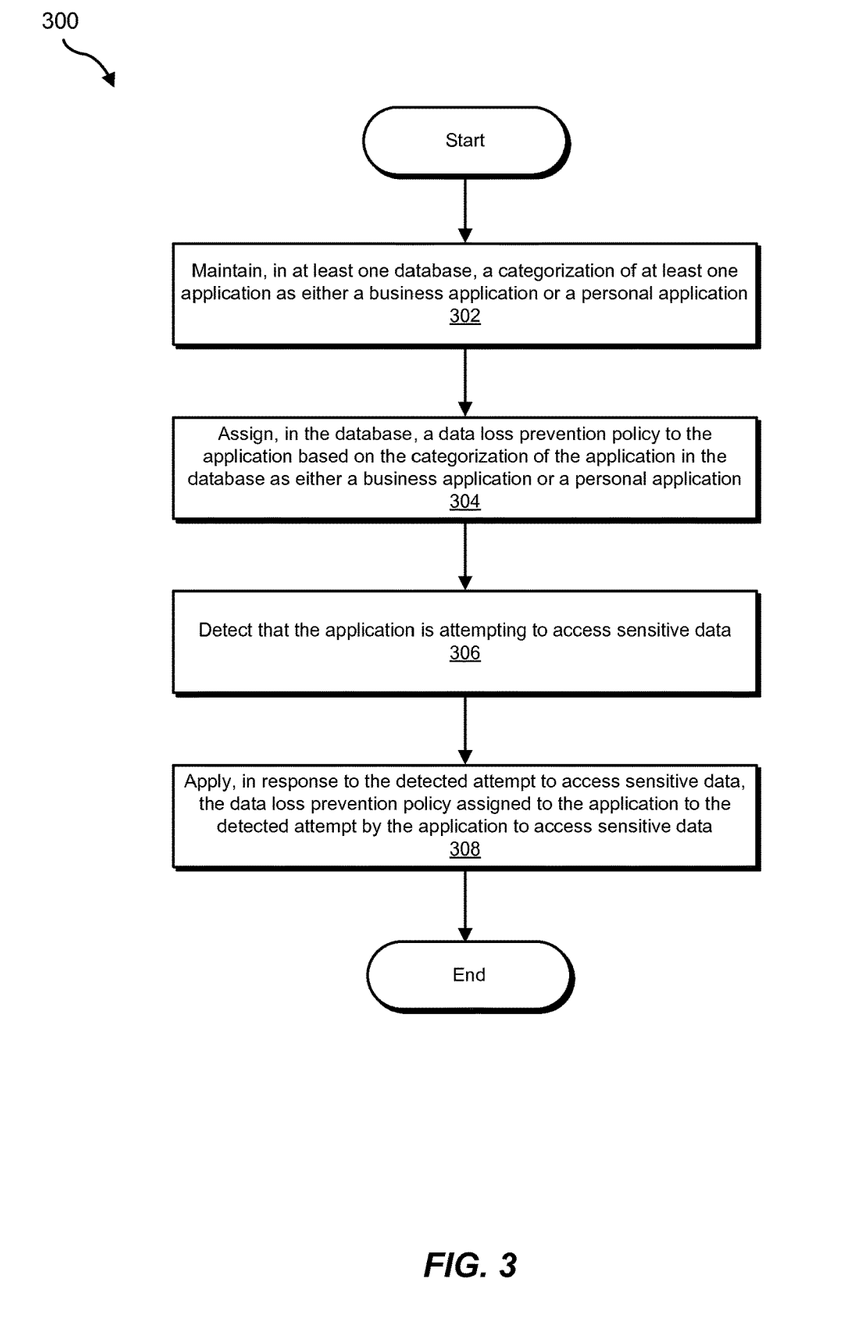
FIG. 3 is a flow diagram of an exemplary method for managing data loss prevention policies for applications.

FIG. 3 is a flow diagram 300 of an exemplary computer-implemented method 300 for managing data loss prevention policies for applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302 in FIG. 3, one or more of the systems described herein may maintain, in at least one database, a categorization of at least one application as either a business application or a personal application. For example, maintenance module 104 may maintain, within categorization database 122, a categorization of software application 208 as either a business application or a personal application.

As used herein, the term "business application" refers to an application that is approved by a business for use within the business for business purposes. In contrast, the term "personal application" refers to an application that is not a business application or is not approved by the business for use within the business for business purposes.

Maintenance module 104 may maintain the categorization of the application in a variety of manners. In some examples, the categorization maintained by maintenance module 104 may represent an absolute categorization that applies to any attempt by the application to detect sensitive data while the application is assigned the absolute categorization. In other examples, the categorization maintained by maintenance module 104 may represent a contingent categorization that depends on a factor other than the application's identity. In some embodiments, maintenance module 104 may maintain a single or multiple categorizations for the application.

Figure 4:
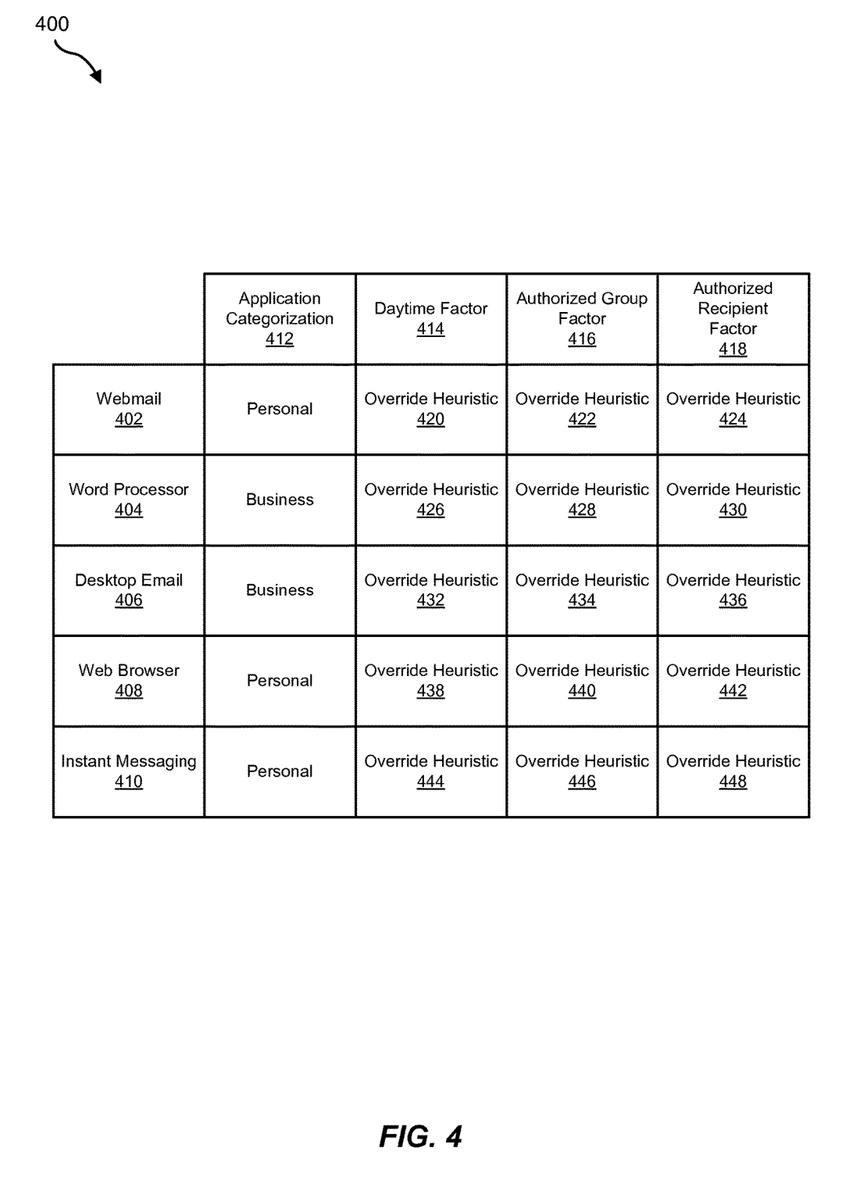
FIG. 4 is a block diagram indicating categorizations of applications within a database.

FIG. 4 is a block diagram 400 illustrating exemplary categorizations of applications within a database, such as categorization database 122. The leftmost column includes the following applications: webmail 402, word processor 404, desktop email 406, web browser 408, and instant messaging 410. For each of these applications, an application categorization 412 may be maintained by maintenance module 104. For example, webmail 402, web browser 408, and instant messaging 410 may be categorized as personal applications. In contrast, word processor 404 and desktop email 406 may be categorized as business applications.

In some examples, the categorizations in application categorization column 412 may represent absolute categorizations for the applications that apply whenever an attempt by the application to access sensitive data is detected. In other examples, the categorizations in application categorization column 412 may represent contingent categorizations. For example, one or more of these categorizations may represent default categorizations that apply unless other factors indicate that the default should not apply.

As shown in FIG. 4, categorization database 122 may include override heuristics 420-448 positioned in columns under various exemplary factors, such as daytime factor 414, authorized group factor 416, and authorized recipient factor 418. In some examples, maintenance module 104 may maintain a contingent categorization of an application based on one or more of these factors and/or may override a default categorization of the application under application categorization column 412 based on one or more of these factors. For example, although maintenance module 104 may generally maintain a categorization of webmail 402 as a personal application (since it is not generally authorized for business purposes), maintenance module 104 may override this default categorization based on one or more of factors 414, 416, and 418. Specifically, maintenance module 104 may maintain a contingent categorization of webmail 402 as a business application if the application is being used during business or authorized hours (e.g., as specified by daytime factor 414), if webmail 402 is being used by a member of a business group authorized to use webmail 402 (e.g., as specified by authorized group factor 416), and/or if webmail 402 is being used to transmit data to a recipient that is authorized to receive the information in question (e.g., as specified by authorized factor 418).

Factors 414, 416, and 418 in FIG. 4 are merely exemplary. Other contingent or override factors may include, for example, whether a particular functionality of the application triggering the DLP system is authorized for business purposes (e.g., where each of various functionalities of the application are categorized as business or personal within categorization database 122), whether a content of information that the application is attempting to access indicates business or personal content (e.g., based on an analysis of the content by a heuristic that considers factors indicating whether the content is directed to business or personal purposes), a quantity of use of the application (e.g., an application may be considered categorized as authorized for business purposes unless used in excess over a permitted threshold), and/or any other potentially relevant factor.

In some examples, maintenance module 104 may also maintain a list of one or more users assigned to each of at least one business group. As used herein, the term "business group" refers to one or more applications and/or members designated by a business, enterprise, organization, or entity as being included within a group for working together for the purposes of the business. For example, a business group may refer to a list of applications for use together, a list of members of the business for working together, or a mixture of applications and members. A business group including only a list of applications may also be described as an "application group." In some embodiments, the members of a business may belong to one or more business groups. Maintenance module 104 may also maintain a list of one or more applications assigned to each business group.

Figure 5:
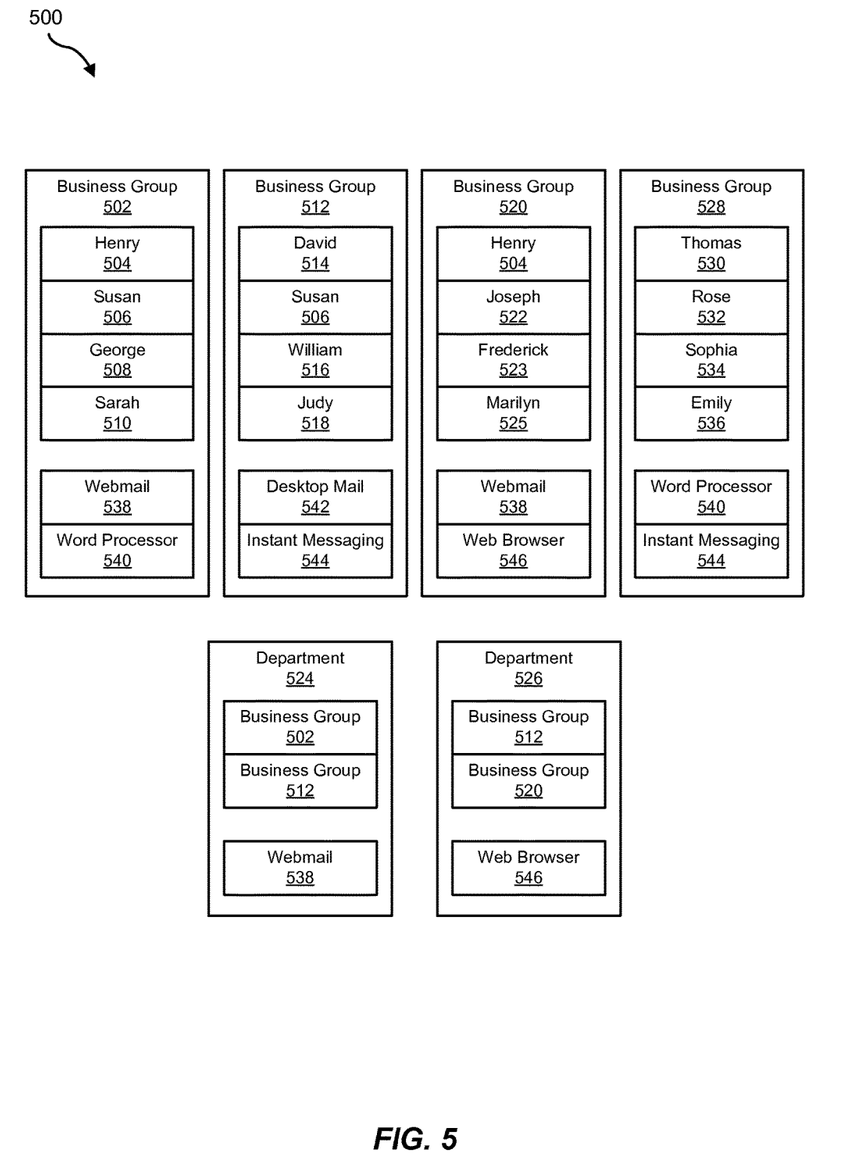
FIG. 5 is a block diagram indicating associations between users, business groups, and/or applications within a database.

FIG. 5 is a block diagram 500 indicating associations between users (e.g., business members using computing system 202), business groups, and/or applications within a database, such as categorization database 202. As shown in FIG. 5, maintenance module 104 may maintain lists of users assigned to each of four business groups 502, 512, 520, and 528. In this example, users 504, 506, 508, and 510 may be assigned to business group 502. As noted above, a user may be assigned to more than one business group. For example, Henry 504 may be assigned to both business groups 502 and 520. As shown in FIG. 5, maintenance module 104 may also maintain a list of applications assigned to each of business groups 502, 512, 520, and 528.

In some examples, maintenance module 104 may maintain the categorization of the application in the database at least in part by basing the categorization on whether a current user of the application is assigned to the same business group as the application in the database. For example, maintenance module 104 may maintain a categorization of the application as a business application when the current user is assigned to the same business group, but may maintain a categorization of the application as a personal application when the current user is not assigned to the same business group. For example, in FIG. 5 Henry 504 is assigned to business groups 502 and 520 and webmail 538 is also assigned to business groups 502 and 520. Thus, maintenance module 104 may maintain a contingent categorization of webmail 538 as a business application based on whether a current user of the application is assigned to the same business group as the application. Accordingly, and as discussed in greater detail below in connection with step 308 in FIG. 3, application module 110 may apply a data loss prevention policy to an attempt by Henry to access sensitive data, where the data loss prevention policy is based on a contingent categorization of webmail 538 as a business application when used by Henry.

In some embodiments, maintenance module 104 may maintain the list of one or more applications at least in part by maintaining, in the database, a list of one or more applications assigned to each of at least one department. The term "department," as used herein, refers to a unit within a business to which one or more business groups are assigned. For example, in FIG. 5, business groups 502 and 512 are assigned to department 524 and business groups 512 and 520 are assigned to department 526.

In one example, maintenance module 104 may maintain the categorization of the application at least in part based on whether a current user of the application is assigned to the same department to which the application is assigned, or is assigned to the same business group that is assigned to the same department to which the application is assigned. For example, if a user is assigned to the same business group that is assigned to the same department, or is directly assigned to the same department, as an application, then the application may be categorized as a business application. In the example of FIG. 5, David 514 is not assigned to a business group that is also directly assigned to webmail 538, but is assigned to business group 512, which is assigned to department 524. Accordingly, application module 110 may apply a data loss prevention policy to an attempt by David to access sensitive data, where the data loss prevention policy is based on a contingent categorization of webmail 538 as a business application when used by David.

In some examples, maintenance module 104 may maintain a categorization of the application as a personal application based on the application not being assigned to any business group. In the example of FIG. 5, a different application, such as a spreadsheet application, may not be assigned to any of business groups 502, 512, 520, and 528. Accordingly, maintenance module 104 may maintain a categorization of the spreadsheet application as a personal application based on the application not being assigned to any business group.

Additionally or alternatively, maintenance module 104 may maintain a status of an application in an uncategorized state. For example, maintenance module 104 may maintain a status for all applications in an uncategorized state. Maintenance module 104 may also convert an uncategorized application into being categorized as a business application or personal application by default, in response to an event or input. For example, as discussed above, maintenance module 104 may maintain a status of an application in an uncategorized state and then, upon assignment module 108 attempting to assign a data loss prevention policy to the application, maintenance module 104 may convert the uncategorized application to being categorized as a personal application by default. Assignment module 106 may also assign a default or other data loss prevention policy to the application based on the application being uncategorized without the application first being categorized as a business application or personal application.

In one embodiment, maintenance module 104 may maintain the categorization of the application at least in part by enabling an administrator to manually assign the categorization. In this embodiment, enabling the administrator to manually assign the categorization may include providing a graphical user interface that enables the administrator to assign or reassign the categorization.

Figure 6:
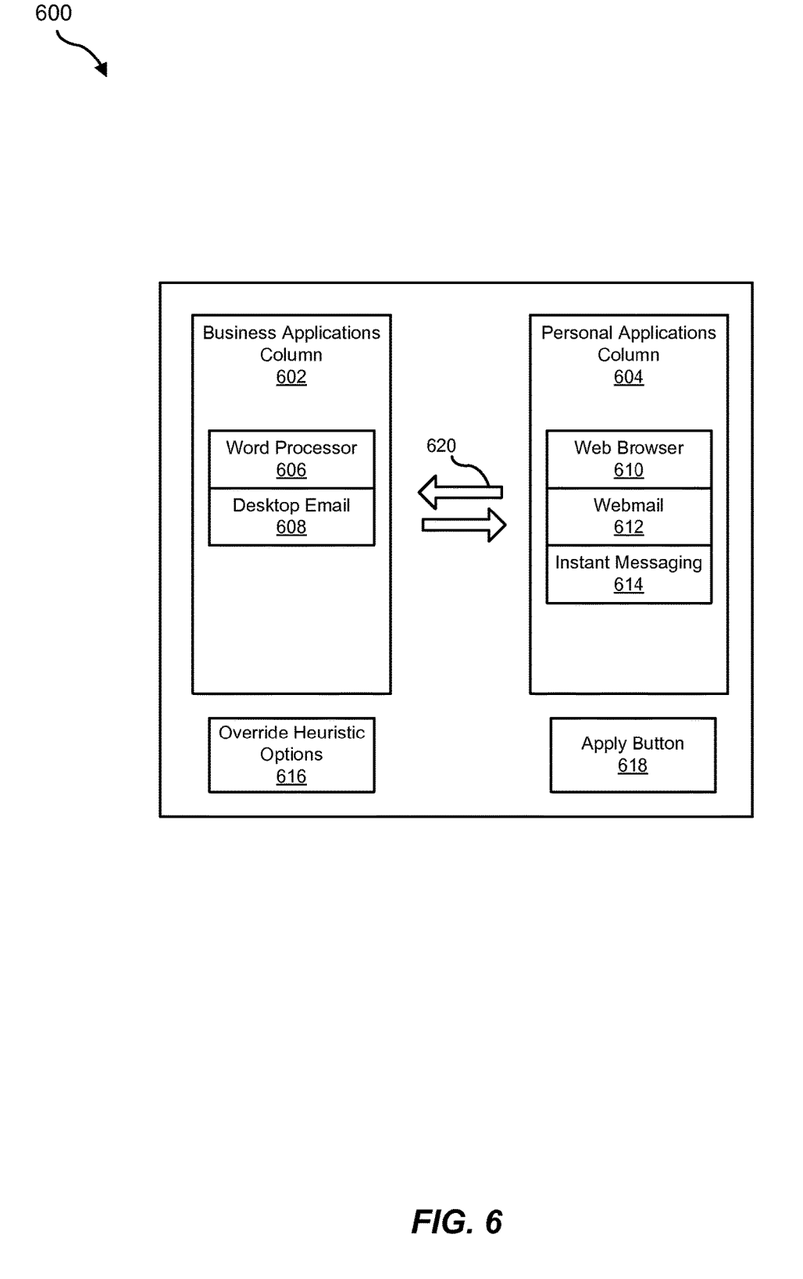
FIG. 6 is a diagram of a graphical user interface for enabling an administrator to categorize applications.

FIG. 6 is a diagram of a graphical user interface (GUI) 600 for enabling an administrator to categorize applications. GUI 600 includes two separate columns for categorizing applications: business applications column 602 and personal applications column 604. One or more applications 606-614, which may correspond to the applications shown in FIGS. 4 and 5, may be assigned to one of business applications column 602 and personal applications column 604. In this example, GUI 600 may enable an administrator of system 100 to assign or reassign any of the applications to one of one of business applications column 602 and personal applications column 604. For example, the administrator may use assignment toggle buttons 620 to move applications from business applications column 602 and personal applications column 604.

GUI 600 may also enable the administrator to maintain contingent categorizations of the application. A contingent categorization may include a categorization of the application as a business application for a particular department. In the example of FIG. 6, the administrator may select override heuristic options 616 to select or define an override heuristic for overriding a default categorization of the application, such as the categorization indicated by business applications column 602 and personal applications column 604. Maintenance module 104 may also enable the administrator to identify one or more factors, and/or factor values, that may influence whether an application is categorized as a business application or personal application.

In some examples, maintenance module 104 may maintain the categorization of the application in the database at least in part by inputting, into a heuristic, factors or factor values that are relevant to determining whether the application is a business application or a personal application. For example, maintenance module 104 may enable an administrator to assign weights to each factor and/or otherwise input Boolean or other logic to define a heuristic or algorithm for determining whether the application is categorized as a business application or a personal application for a particular department. Maintenance module 104 may also enable an administrator to input thresholds that designate between when a result of the heuristic or algorithm designates a business application or instead designates a personal application (e.g., a threshold of 5 might indicate that results of the heuristic or algorithm over 5 indicate a business application, and results at or below 5 indicate a personal application).

Factors identified by the administrator (e.g., through GUI 600) and included within the heuristic or algorithm may include any of the factors discussed above regarding FIGS. 4 and 5, including those related to daytime or work hours, approved senders and recipients, and approved business groups and departments. The factors may also include: a degree to which other members of the business use the application (i.e., more members using the application indicates a greater likelihood that the application is a business application), a degree to which business members use the application to interact with business or sensitive information (i.e., more interaction indicates a greater likelihood that the application is a business application), a degree to which the application has caused, or been involved in, previous instances of policy, such as security or DLP policy, non-compliance (i.e., more non-compliance indicates a greater likelihood that the application is a personal application), whether users log into the application using personal or business credentials (i.e., personal credentials indicate a personal application, and vice versa), and/or the reputations of users of the application (i.e., users with reputations for better work performance, better security or DLP compliance, and/or being more trusted by the business indicate a greater likelihood that the application is a business application).

In some examples, these factors may also be originally present, or predefined, within maintenance module 104 without manual input from the administrator or other user. Maintenance module 104 may automatically, or autonomously, create or execute heuristics or algorithms on the factors to estimate or determine whether the application is a business application or personal application. Maintenance module 104 may also maintain an absolute or contingent categorization of the application based on the result of the heuristic or algorithm.

In some examples, maintenance module may receive factor values from an administrator's manual input. Alternatively, maintenance module 104 may input factor values autonomously (i.e., without manual input) through scanning or analyzing one or more features of the application, the application's attempt to access data, and/or computing system 202. Maintenance module 104 may also maintain the categorization of the application in the database at least in part by executing the heuristic on the factors.

In one embodiment, inputting the factors or factor values by maintenance module 104 may include inputting a factor or factor value from each of multiple users of the application. For example, one administrator may identify a first factor or value and a second administrator may identify a second factor or value relevant to determining whether the application is a business application or a personal application for a particular department. One or both of the administrators, and/or maintenance module 104, may create a heuristic or algorithm for use on the factors input from the multiple users of the application. Upon designating a column 602 or 604 using assignment toggle buttons 620, and/or designating heuristics or factors (or factor values) using override heuristics options 616, the administrator may apply the designated settings using apply button 618.

Returning to FIG. 3, at step 304 one or more of the systems described herein may assign, in the database, a data loss prevention policy to the application based on the categorization of the application in the database as either a business application or a personal application. For example, assignment module 106 may assign a data loss prevention policy to software application 208 based on the categorization of the application in the database.

Assignment module 106 may assign the data loss prevention policy in a variety of manners. For example, assignment module 106 may select a first preexisting data loss prevention policy instead of a second preexisting data loss prevention policy based on the categorization of the application. Assignment module 106 may also create a data loss prevention policy based on the categorization of the application and/or one or more of the factors discussed above relevant to determining whether the application is a business application or a personal application.

In some embodiments, a more restrictive data loss prevention policy may be assigned by assignment module 106 based at least in part on the application being categorized as a personal application. Similarly, a less restrictive data loss prevention policy may be assigned by assignment module 106 based at least in part on the application being categorized as a business application. As used herein, the "restrictiveness" of a data loss prevention policy refers to a degree to which the data loss prevention policy either limits functionality of the application to the user or monitors use of the application by the user. For example, a more restrictive data loss prevention policy may monitor more of a user's interactions with an application than a less restrictive data loss prevention policy. A more restrictive data loss prevention policy may include a policy that is more restrictive for one dimension or functionality of the data loss prevention policy without being less restrictive for any other dimension or functionality.

In some examples, the more restrictive data loss prevention policy may represent or include a blocking response rule that blocks at least one user action. In contrast, the less restrictive data loss prevention policy may represent or include a monitoring response rule that monitors, but does not block, the user action. For example, assignment module 106 may assign a blocking data loss prevention response rule to an application based on the application being categorized as a personal application, and may assign a monitoring data loss prevention response rule to another application, or to the same application in a different circumstance, based on the application being categorized as a business application.

In the example of FIG. 4, webmail 402 may be categorized as a business application for use of webmail 402 during normal business hours, based on daytime factor 414, and therefore be assigned, by assignment module 106, a monitoring response rule that monitors outgoing email without blocking the outgoing email. In contrast, webmail 402 may be categorized as a personal application for use of webmail 402 outside of normal business hours, based on daytime factor 414, and therefore may be assigned, by assignment module 106, a blocking response rule that blocks outgoing email.

Assignment module 106 may also assign the data loss prevention policy based on factors in addition to, or alternative to, the categorization of the application. For example, assignment module 106 may assign the data loss prevention policy based on a user group or business group to which the application is assigned, or to which a current user of the application is assigned (e.g., a current user attempting to access sensitive data). Assignment module 106 may also assign the data loss prevention policy based on one or more application groups to which the application is assigned. Each of the user or application groups may be associated with, or assigned to, one or more data loss prevention policies. For example, assignment module 106 may execute one or more heuristics or algorithms to assign a data loss prevention policy to the application in situations where one or more user groups, application groups, and/or categorizations conflict or otherwise indicate or suggest different data loss prevention policies (i.e., to decide between which of various data loss policies to apply).

In one embodiment, assignment module 106 may assign the data loss prevention policy through a process of filtering, or distinguishing between, a totality of data loss prevention policies. Assignment module 106 may first filter data loss prevention policies to those assigned to a user group to which the application and/or a current user of the application is assigned. Assignment module 106 may then filter data loss prevention policies, from the remaining policies, to those assigned to an application group to which the application is assigned. Assignment module 106 may then assign a specific data loss prevention policy or response rule to the application. Assignment module 106 may generally assign the data loss prevention policy based on any permutation of one or more of the following factors, considered in any order: 1) whether an attempt to access sensitive data was detected (and/or the kind of data or degree of sensitivity), 2) a user group to which the application is assigned or to which the current user of the application is assigned, 3) an application group to which the application is assigned, and 4) a categorization of the application (e.g. as a business application or a personal application). These factors are merely exemplary.

Returning to FIG. 3, at step 306 one or more of the systems described herein may detect that the application is attempting to access sensitive data. For example, at step 306 detection module 108 may detect that software application 208 is attempting to access sensitive data.

Detection module 108 may detect that the application is attempting to access sensitive data in a variety of manners. In one example, detecting module 108 may detect that the application is attempting to access sensitive data at least in part by first identifying the sensitive data. As used herein, the term "sensitive data" may refer to data protected or monitored by a data loss prevention policy system. Sensitive information may include intellectual property (or candidates for intellectual property), user manuals, and/or business secrets. Sensitive information may also include personal identifying information, including a phone number, address, social security number, birthdate, and/or any other information that tends to uniquely identify a person.

In some examples, detection module 108 may identify sensitive information by detecting a form of the information, such as the form of a phone number or social security number. Detection module 108 may also identify sensitive information by detecting that the information was previously categorized and/or labeled as sensitive. For example, detection module 108 may detect that a signature (e.g., hash) of information matches a hash of information identified as sensitive.

In one embodiment, detection module 108 may categorize and/or label information as sensitive by modifying the information to include a human-readable and/or machine-readable indication that the information is sensitive. The human-readable indication may be conspicuous to a human observer and/or label the information as sensitive and instruct a human reader to not leak the information. The machine-readable indication may include a watermark or digital fingerprint (e.g., metadata that does not affect an image output of the information) that is inconspicuous to human observers. Detection module 108 may label some or all information internal to a computing system, business network, and/or transmitted within a business network, as sensitive.

In some examples, detection module 108 may identify sensitive information through machine learning. Machine learning may include comparing information to previously identified information known to be sensitive and/or information known to be non-sensitive. Machine learning may also include feeding results of previous attempts to identify sensitive information to a machine learning system to thereby train the machine learning system to learn from earlier mistakes and successes.

In one example, detection module 108 may detect the attempt by the application to access sensitive information at least in part by monitoring the behavior of the application. In this example, monitoring the behavior of the application may include actively inspecting input/output to or from the application for sensitive information. Detection module 108 may also detect the attempt by the application to access sensitive data at least in part by receiving a notification from the application indicating that it is attempting to access sensitive information. For example, detection module 108 may previously modify the application or an environment containing the application (e.g., an operating system) to cause the notification to be automatically transmitted from the application, or the application environment (e.g., the operating system), to detection module 108 for some or all attempts by the application to access sensitive data.

In one embodiment, detection module 108 may detect the attempt by the application to access sensitive information at least in part by detecting an attempt to leak information from a computing system and/or network. In this embodiment, detecting an attempt to leak information may include detecting a transmission of the information across, or to the outside of, a computing network. For example, detection module 108 may monitor packets and/or transmissions across a computing network, such as network 204, to detect sensitive information in the packets and/or transmissions. Detecting an attempt to leak information may also include detecting an outputting of information to an external drive or device of a computing system, including a printing device, faxing device, display device, hard drive, and/or flash drive, and/or any other suitable device for extracting information from inside a computing system or network.

Returning to FIG. 3, at step 308 one or more systems described herein may apply, in response to the detected attempt to access sensitive data, the data loss prevention policy assigned to the application to the detected attempt by the application to access sensitive data. For example, at step 308 application module 110 may apply, in response to the detected attempt to access sensitive data, the data loss prevention policy assigned to software application 208 to the detected attempt by the application to access sensitive data.

Application module 110 may apply the data loss prevention policy in a variety of manners. For example, application module 110 may originally mark, or further mark, the sensitive information with a machine-readable and/or human-readable notification that the information is sensitive and/or should not be leaked. Application module 110 may also apply a blocking response rule that blocks the attempt to access the information. In this example, blocking the attempt to access the information may include blocking an attempt to transmit the information across a computing network or to outside the computing network. Blocking the attempt to access the information may also include blocking an attempt to output the information to an external drive or device, such as a printing device, faxing device, display device, hard drive, and/or flash drive, as described above. For example, application module 110 may apply a blocking response rule to an attempt by an application categorized as a personal application to access sensitive information.

In some examples, application module 110 may apply the data loss prevention policy by applying a monitoring response rule to the attempt to access sensitive data that, as explained above, monitors the attempt to access sensitive data without blocking the attempt. For example, application module 110 may apply a monitoring policy to attempts by an application categorized as a business application to access sensitive data.

In one example, application module 110 may apply the data loss prevention policy at least in part by querying a user and/or administrator (i.e., a user attempting to access the data or another user) whether the information should be accessed, transmitted, and/or output. Application module 110 may also apply the data loss prevention policy at least in part by reporting the attempt to access sensitive data to an administrator or other user, such as a supervisor of the current user of the application. Application module 110 may also apply the data loss prevention policy at least in part by authenticating a current user of the application and/or verifying that the user is privileged to access the information. Application module 110 may also apply the data loss prevention policy at least in part by encrypting the sensitive information.

In some embodiments, application module 110 may apply the data loss prevention policy at least in part by rewarding a user that complies with the data loss prevention policy. Application module 110 may also apply the data loss prevention policy at least in part by disciplining or reprimanding a user that fails to comply with the data loss prevention policy. Upon completion of step 308, the process flow of exemplary method 300 in FIG. 3 may terminate.

Application module 110 may also apply the data loss prevention policy at least in part by assigning the data loss prevention policy to the application at step 304 in response to the detection at step 306. In other words, instead of, or in addition to, step 304 being prior to the detection step 306, step 304 may be performed at the beginning of step 308 in response to the detection at step 306. Application module 110 may have the assignment step 304 performed by performing the step itself, by performing it in cooperation with assignment module 106, and/or by instructing assignment module 106 to perform step 304.

As detailed above, the systems and methods disclosed herein may enable data loss prevention systems to execute in an application-centric fashion, in alternative or addition to a data-centric fashion. Because these systems and methods may be application-centric, they may distinguish between applications that should be allowed to interact with sensitive data and those that should not. In addition, even when applications are allowed interact with sensitive data, these applications are not merely whitelisted, but their interactions may be monitored so that visibility of the flow of sensitive data is maintained.

Figure 7:
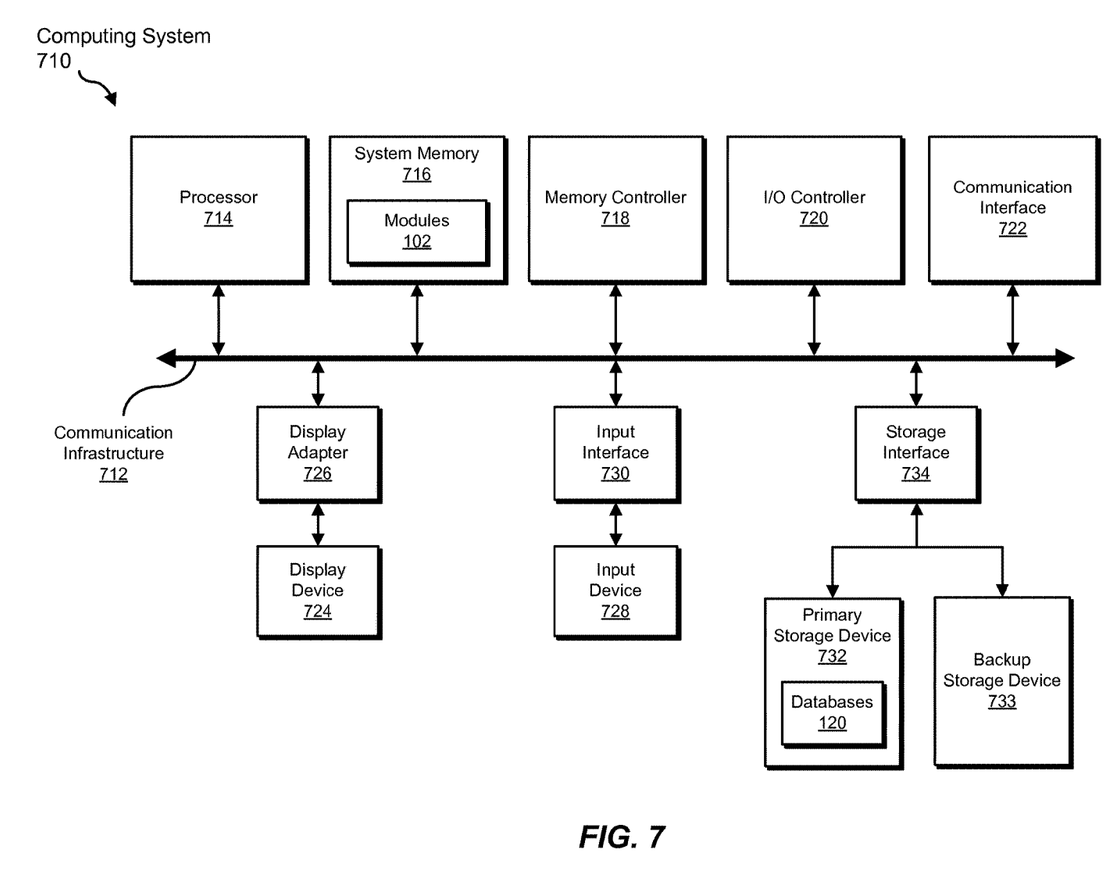
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 410 may perform and/or be a means for performing, either alone or in combination with other elements, one or more of the maintaining, assigning, detecting, applying, basing, blocking, monitoring, enabling, providing, inputting, and/or executing steps described herein. All or a portion of computing system 410 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
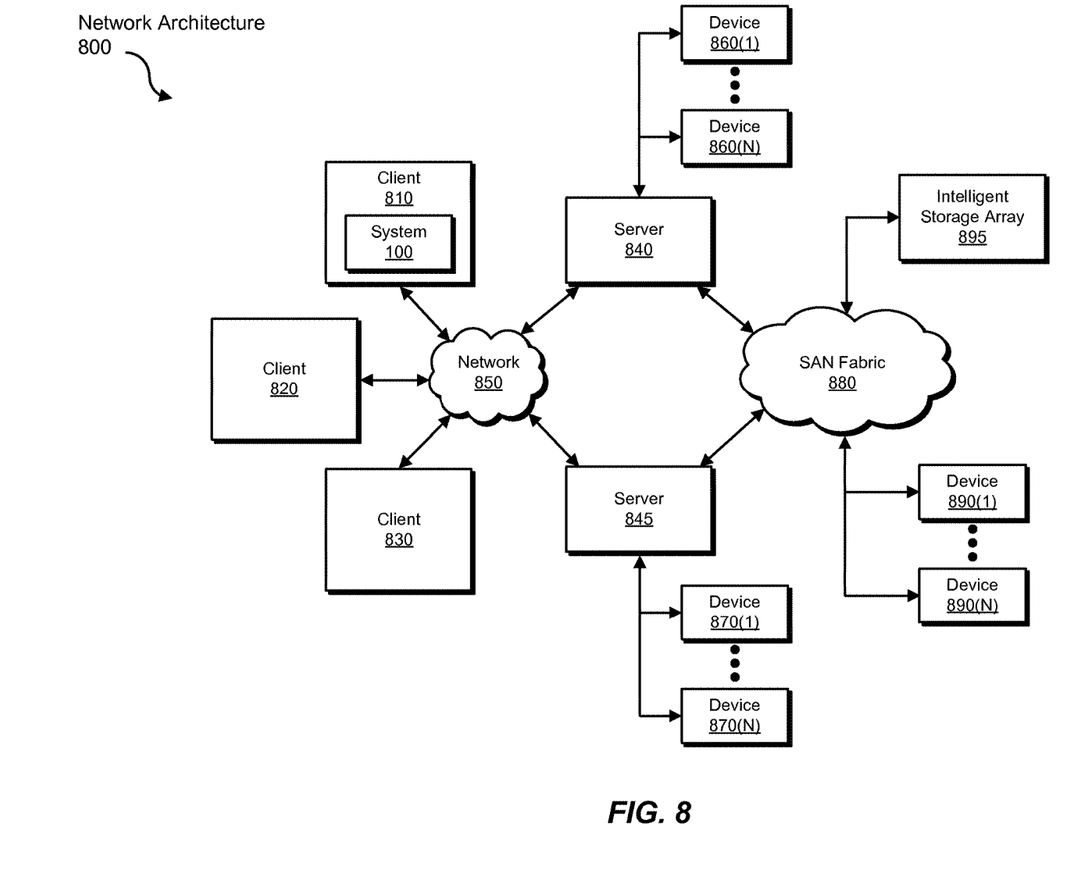
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the maintaining, assigning, detecting, applying, basing, blocking, monitoring, enabling, providing, inputting, and/or executing steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for managing data loss prevention policies for applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform computing system 202 and/or server 206 into a device capable of assigning, within a database, a data loss prevention policy to an application based on the categorization of the application within the database as either a business application or a personal application.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing data loss prevention policies for applications, at least a portion of the method being performed by a computing device comprising at least one processor, the method comprising:
   maintaining, in at least one database, a categorization of at least one application as a business application;
   assigning, in the database, a data loss prevention policy to the application based on the categorization of the application in the database as a business application at least in part by assigning to the application, based on the categorization of the application in the database as a business application, a monitoring data loss prevention response rule that monitors user action by reporting user action without blocking user action;
   detecting that the application is attempting to access sensitive data;
   applying, by a data loss prevention system in response to the detected attempt by the application to access sensitive data, the data loss prevention policy assigned to the application by reporting the attempt to access sensitive data without blocking the attempt; and
   applying an override heuristic for overriding the categorization of the application as a business application by categorizing the application as a personal application instead of a business application in response to determining that the application has been used in excess over a threshold permitted by the data loss prevention system.

2. The method of claim 1, wherein the application comprises at least one of a webmail application, a word processor application, a desktop email application, a web browser application, and an instant messaging application.

3. The method of claim 1, wherein the categorization is maintained in the database at least in part by toggling a setting in a field that corresponds to the application, the setting specifying that the application is categorized as a business application.

4. The method of claim 1, wherein:
   assigning the data loss prevention policy comprises basing a degree of restrictiveness of the data loss prevention policy on the categorization of the application in the database as a business application such that a less restrictive data loss prevention policy is based at least in part on the application being categorized as a business application.

5. The method of claim 1, further comprising maintaining, in the database, a list of one or more applications assigned to each of at least one business group.

6. The method of claim 5, wherein maintaining the categorization of the application in the database comprises basing the categorization on whether a current user of the application is assigned to the same business group as the application in the database.

7. The method of claim 5, wherein maintaining the list of one or more applications comprises maintaining, in the database:
   a list of one or more applications assigned to each of at least one department; and
   a list of one or more business groups assigned to each of the at least one department.

8. The method of claim 7, wherein an additional application is categorized as a personal application based on the application not being assigned to the at least one department.

9. The method of claim 1, wherein maintaining the categorization of the application in the database comprises enabling an administrator to manually assign the categorization.

10. The method of claim 9, wherein enabling the administrator to manually assign the categorization comprises providing a graphical user interface that enables the administrator to assign or reassign the categorization.

11. The method of claim 1, wherein maintaining the categorization of the application in the database comprises:
inputting, into a heuristic, factors that are relevant to determining whether the application is a business application or a personal application; and
executing the heuristic on the factors.

12. The method of claim 11, wherein inputting the factors comprises inputting a factor from each of multiple users of the application.

13. A data loss prevention system for managing data loss prevention policies for applications, the data loss prevention system comprising:
a maintenance module programmed to maintain, in at least one database, a categorization of at least one application as a business application;
an assignment module programmed to assign, in the database, a data loss prevention policy to the application based on the categorization of the application in the database as a business application at least in part by assigning to the application, based on the categorization of the application in the database as a business application, a monitoring data loss prevention response rule that monitors user action by reporting user action without blocking user action;
a detection module programmed to detect that the application is attempting to access sensitive data;
an application module programmed to apply, as part of the data loss prevention system and in response to the detected attempt by the application to access sensitive data, the data loss prevention policy assigned to the application by reporting the attempt to access sensitive data without blocking the attempt; and
wherein the maintenance module is further programmed to apply an override heuristic for overriding the categorization of the application as a business application by categorizing the application as a personal application instead of a business application in response to determining that the application has been used in excess over a threshold permitted by the data loss prevention system; and
at least one processor configured to execute the maintenance module, the assignment module, the detection module, and the application module.

14. The data loss prevention system of claim 13, wherein the assignment module is programmed to assign the data loss prevention policy at least in part by basing a degree of restrictiveness of the data loss prevention policy on the categorization of the application in the database as a business application.

15. The data loss prevention system of claim 14, wherein a less restrictive data loss prevention policy is based at least in part on the application being categorized as a business application.

16. The data loss prevention system of claim 15, wherein the maintenance module is programmed to receive input that identifies the override heuristic for overriding the categorization of the application as a business application.

17. The data loss prevention system of claim 13, wherein the maintenance module is further programmed to maintain, in the database, a list of one or more applications assigned to each of at least one business group.

18. The data loss prevention system of claim 17, wherein the maintenance module is programmed to maintain the categorization of the application in the database at least in part by basing the categorization on whether a current user of the application is assigned to the same business group as the application in the database.

19. The data loss prevention system of claim 17, wherein the maintenance module is programmed to maintain a categorization of an additional application as a personal application based on the application not being assigned to at least one department.

20. A non-transitory computer-readable-storage medium comprising one or more computer-executable instructions that, when executed by at least one processor of a computing device, cause the computing device to:
maintain, in at least one database, a categorization of at least one application as a business application;
assign, in the database, a data loss prevention policy to the application based on the categorization of the application in the database as a business application at least in part by assigning to the application, based on the categorization of the application in the database as a business application, a monitoring data loss prevention response rule that monitors user action by reporting user action without blocking user action;
detect that the application is attempting to access sensitive data;
apply, by a data loss prevention system in response to the detected attempt by the application to access sensitive data, the data loss prevention policy assigned to the application by reporting the attempt to access sensitive data without blocking the attempt; and
apply an override heuristic for overriding the categorization of the application as a business application by categorizing the application as a personal application instead of a business application in response to determining that the application has been used in excess over a threshold permitted by the data loss prevention system.

* * * * *